United States Patent Office 3,239,341
Patented Mar. 8, 1966

3,239,341
ESTROGENIC COMPOUNDS AND ANIMAL
GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Filed Feb. 15, 1965, Ser. No. 432,811
20 Claims. (Cl. 99—2)

The present invention relates to new compounds and an object of the present invention is to provide compounds which exhibit estrogenic activity or aid in increasing the rate of growth in meat-producing animals, e.g. cattle, lamb and swine.

A conventional formula for the compounds of the present invention is:

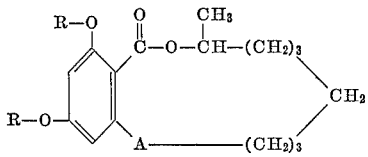

where A is —$CH_2$—$CH_2$— or —CH=CH—; R is hydrogen, substituted or unsubstituted alkyl, e.g. lower alkyl such as methyl, ethyl, hexyl, etc., and acyl, e.g. lower saturated acyclic acyl radicals such as acetyl and valeryl, but hydrogen is preferred. Compounds having the above formula where R is substituted or unsubstituted aryl, e.g. phenyl and bromophenyl, and aralkyl, e.g. benzyl, are also contemplated by the present invention.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps; vegetable proteins like soybean oil meal or peanut oil meal; vitaminaceous materials, e.g. vitamin A and D mixtures; riboflaving supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention can be produced from the compound:

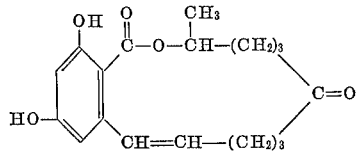

hereinafter referred to as the fermentation estrogenic substance (F.E.S.) by reduction of the ketone group to replace the oxygen of the ketone group with two hydrogen atoms. The reduction of the ketone group can be effected by several procedures. One of these procedures involves the Clemmensen reduction using zinc and hydrochloric acid; another involves the Wolff-Kishner reduction using hydrazine and alkali, e.g. NaOH, and the third involves formation of the dithioacetal with ethylene dithiol or ethylmercaptan and the catalytic desulfurization with Raney nickel catalyst containing adsorbed hydrogen.

In producnig compounds of the present invention where A is —$CH_2$—$CH_2$— the olefinic bond of F.E.S. can be reduced, for example, by hydrogenation in the presence of a Group VIII metal, particularly platinum or palladium catalyst on a suitable carrier, e.g. charcoal. Generally, the catalyst contains from about 0.01 to about 10% of the catalytic metal. The catalyst is used in a ratio of generally from 0.02 to 2 grams of catalyst, preferably about 0.1 to 0.5 gram, and particularly about 0.2 gram catalyst per gram of F.E.S. The reduction may be carried out while the F.E.S. is dissolved in a suitable solvent, e.g. an alcohol, especially a lower alkanol such as 2-propanol, methanol, ethanol, and acid, e.g. acetic acid, etc. at ambient temperatures; e.g. from about 15° to 40° C., and ambient pressures, since only the presence of hydrogen is required; however, it is preferred to utilize an elevated pressure, e.g. from about 1 to 50 atmospheres of hydrogen.

In producing compounds of the present invention where R is alkyl, conventional alkylation procedures can be used to replace the H atom of one or both of the OH groups on the benzene ring of F.E.S. with an alkyl group. Alkylated dihydro F.E.S. compounds can be produced, for example, by first alkylating F.E.S. and then reducing it as set forth supra, or by first reducing it and then alkylating it. The alkylation can be by reaction with the corresponding dialkyl sulfates, e.g. dimethyl sulfate, diethyl sulfate, etc., to produce the dialkyl F.E.S. or a monoalkyl F.E.S. with the alkyl group replacing the hydrogen of the hydroxyl group on the benzene ring ortho to the ester group. Furthermore, a monomethyl F.E.S. compound with the methyl group replacing the hydrogen of the hydroxyl group para to the ester group can be selectively produced using diazomethane.

In producing compounds of the present invention where R is acyl, conventional acylation procedures can be used to replace the hydrogen atom of one or both of the hydroxyl radicals on the benzene ring of F.E.S. with an acyl radical. Acylated F.E.S. compounds can be produced, for example, by reaction with the corresponding acid anhydride, e.g. acetic anhydride, propionic anhydride, etc., catalyzed with, for example, sodium acetate or pyridine. Ambient conditions can be used although it is preferred to keep the reaction mixture cold. When compounds having one R as alkyl and the other acyl, it is advantageous to alkylate before acylating.

The fermentation estrogenic substance (F.E.S.) is so named since a convenient method for producing it is by cultivating, on a suitable nutrient medium, the organism *Gibberella zeae* (Gordon) on deposit at the Northern Utilization Research and Development Division of the United States Department of Agriculture under the number NRRL–2830.

The following examples are offered to illustrate this invention; however, the invention is not limited to the specific materials, amounts, and procedures set forth. The first example illustrates preparation of a suitable inoculum containing the organism *Gibberella zeae* (Gordon) NRRL–2830.

Example 1

A spore sand culture containing *Gibberella zeae* (Gordon) NRRL–2830 was aseptically placed in a sterile tube containing 15 milliliters of Czapek's-Dox solution and a small amount of agar. This medium was then incubated for about 168 hours at approximately 25° C. At the end of the incubation period, the medium was washed with 5 milliliters of sterile deionized water and transferred to a sterile tube containing 45 milliliters of Czapek's-Dox solution. The contents of the tube were then incubated for about 96 hours at about 25° C. after which the material was available for use in inoculation of a fermentation medium.

The following example illustrates the fermentation of the organism *Gibberella zeae* (Gordon) NRRL–2830 to produces F.E.S.

*Example II*

To a 2 liter flask were added 300 grams of finely divided corn. The flask and its contents were then sterilized and after sterilization 150 milliliters of sterile deionized water were added. To the mixture in the flask were then added 45 milliliters of the inoculum prepared by the process of Example I and the material was thoroughly mixed. The mixed material was then incubated for about 20 days at 25° C. in a dark room in a water-saturated atmosphere.

The following example illustrates the recovery of F.E.S. from the fermentation medium.

*Example III*

A 300 gram portion of fermented material produced by the method of Example II was placed in 500 milliliters of deionized water and slurried. The slurry was then heated for about 15 minutes at 75° C., 300 grams of filter aid were then added and the material was filtered. The solid filtered material containing the anabolic substance was then air dried, and 333 grams of the dried cake were then extracted with 500 milliliters of ethanol. This procedure was repeated three more times. The ethanol extract was evaporated to dryness under vacuum to give 6.84 grams of solid material. This solid material was then dissolved in 20 milliliters of chloroform and extracted with 30 milliliters of an aqueous solution containing 5% by weight of sodium carbonate having an adjusted pH of about 11.2. The extraction process was repeated seven more times. The pH of the sodium-carbonate extract was then adjusted to 6.2 with hydrochloric acid, to yield an anabolic substance-containing precipitate. The precipitate and the aqueous sodium carbonate extract were then each in turn extracted with 75 milliliters of ethyl ether. This procedure was repeated three more times to yield a light yellow ethereal solution, which was then evaporated to yield 116 milligrams of solid anabolic substance. This material was then subjected to multiple transfer countercurrent distribution using 100 tubes and a solvent system consisting of two parts chloroform and two parts carbon tetrachloride as the lower phase and four parts methanol and one part water as the upper phase, all parts by volume. The solid material obtained from the multiple transfer countercurrent distribution was F.E.S.

*Example IV*

Two 10 gram portions of F.E.S., each in 200 milliliters acetic acid, were catalytically reduced at room temperature in the presence of 1.2 grams of PdO catalyst at a hydrogen pressure of about 45 p.s.i. The combined reduction mixtures were heated to boiling, filtered, and the filter cake was washed with 50 milliliters of hot acetic acid. The cooled filtrate was added, with stirring, to 2 liters of water. The mixture was stirred for 15 minutes and the white solid was collected by filtration, washed and dried in a vacuum desiccator to yield 19.1 grams of dihydro F.E.S. having a melting point of 191°–193° C.

The dihydro F.E.S. (1 gram) is added slowly with cooling (ice-bath), to a mixture of 5 cc. of ethylene dithiol .25 gram of freshly fused zinc chloride and 2 grams of anhydrous sodium sulfate, contained in a microflask. The mixture is maintained at 5° C. for 20 hours and then at room temperature for 4 hours, whereupon it is poured into 50 cc. of ice and the precipitate is collected and subjected to hydrogenolysis. To the reaction product is added 100 cc. of 90% ethanol and 15 grams of Raney nickel catalyst and the mixture is refluxed until the reaction is complete. The nickel is removed by centrifugation and is washed several times with hot ethanol by centrifugation followed by decantation, and the centrifugates are combined. The mixture is evaporated to dryness and the residue is suitably recrystallized to yield a compound having the formula:

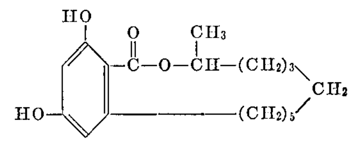

*Example V*

The procedure used in Example IV is essentially followed with the exception that F.E.S. is used instead of dihydro F.E.S. to produce a compound having the formula:

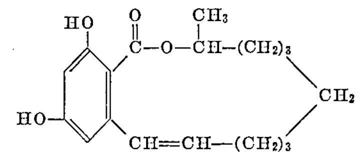

The following example illustrates the production of a monomethyl F.E.S. derivative having the methyl group replacing the hydrogen in the hydroxyl group para to the ester group of F.E.S.

*Example VI*

Nitrosomethylurea in an amount of 1.2 grams was slowly added to a cold mixture of 3.6 milliliters of 50% potassium hydroxide and 17 milliliters of ether. After a few minutes the yellow ether layer of the mixture was decanted, dried over potassium hydroxide, and then added to a solution of 0.30 gram F.E.S. in 17 milliliters of ether. The resulting yellow mixture was left overnight in a loosely stoppered flask and then ether and diazomethane were evaporated using a steam bath. The remaining gummy residue was crystallized by adding 3 milliliters of water, heating to 60° C., and adding ethanol almost to solution. On cooling, crystals formed yielding 0.137 gram of a product having a melting point of 111°–116° C. which was recrystallized in the same way to yield 0.082 gram of monomethyl F.E.S. having a melting point of 120°–122° C. and analyzing:

| | Calc. ($C_{19}H_{24}O_5$) | Found |
|---|---|---|
| Percent C | 68.7 | 68.3 |
| Percent H | 7.28 | 7.38 |
| Percent $OCH_3$ | 9.34 | 9.17 |

The p-methyl F.E.S. is substituted for the dihydro F.E.S. in following essentially the same procedure used in Example IV to produce a compound having the formula:

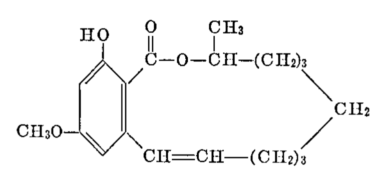

The following example illustrates the production of dimethyl F.E.S. and monomethyl F.E.S. derivatives, the monomethyl F.E.S. derivative having the hydrogen in the hydroxyl group ortho to the ester group replaced with a methyl group.

Example VII

Dimethyl sulfate (5 milliliters) was added to a solution of 2.24 grams of F.E.S. in 80 milliliters 10% NaOH and 20 milliliters water. The mixture was stirred for one-half hour at 18°–20° C. (cooling bath) and an additional 5 milliliters of dimethyl sulfate was added. After an additional 70 minutes of stirring at 20°–26° C., the solid precipitate, Solid A, was collected by filtration, washed with water and dried in a vacuum desiccator. The filtrate from Solid A was acidified with 25 milliliters 12 N $H_2SO_4$ to yield a second precipitate, Solid B, which was collected, washed with water, and dried.

Solid A (0.79 gram having a melting point of 114°–118° C.) was recrystallized from a mixture of 10 milliliters water and 15 milliliters ethanol to yield 0.66 gram of dimethyl F.E.S. having a melting point of 108°–110° C.

Solid B (1.39 grams having a melting point of 152°–162° C.) was recrystallized twice from a mixture of water and alcohol to yield 0.8 gram of monomethyl F.E.S. having a melting point of 169°–174° C. and the following analysis of recrystallized Solid B (monomethyl F.E.S.) was obtained:

|  | Calc. ($C_{19}H_{24}O_5$) | Found |
|---|---|---|
| Percent C | 68.65 | 67.97 |
| Percent H | 7.28 | 7.16 |
| Percent OMe | 9.34 | 9.28 |

Each of the o-methyl F.E.S. and the dimethyl F.E.S. is substituted for the dihydro F.E.S. in the procedure of Example IV to produce the respective compounds:

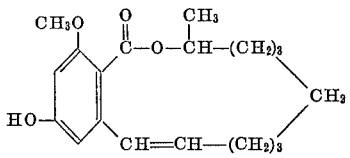

and

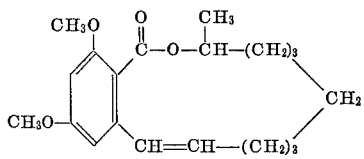

The following example illustrates the production of an acylated monomethyl F.E.S. derivative.

Example VIII

To a solution of 368 milligrams of p-methyl F.E.S. in 8 milliliters pyridine is added 5 milliliters acetic anhydride and the mixture is held at room temperature for 16 hours. Twenty-five milliliters of water are then added. The mixture is stored in a refrigerator for 2 hours. The solid precipitated is collected by filtration, washed with water and dried in a vacuum desiccator to recover a compound which is substituted for the dihydro F.E.S. in the procedure of Example IV to produce a compound of the formula:

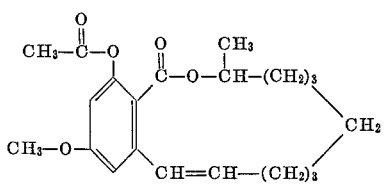

which is recovered.

Example IX

The compound:

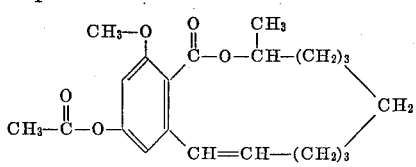

is produced by substituting o-methyl F.E.S. for the dihydro F.E.S. in the procedure of Example IV.

The production of the dimethyldihydro F.E.S. derivative is illustrated by the following example.

Example X

Dihydro F.E.S. (556 milligrams) was dissolved in 25 milliliters 10% NaOH and 10 milliliters water and the solution was stirred. To the stirred solution was added three, two-milliliter portions of dimethyl sulfate at half hour intervals followed by stirring for an additional hour. The mixture was acidic and it was made alkaline by the addition of 10 milliliters 10% NaOH and the alkaline mixture was stirred for one-half hour. The solid formed was collected by filtration, washed with water and dried in a vacuum desiccator. The product weighed 526 milligrams and melted at 115°–117° C. Recrystallization from a mixture of 10 milliliters of water and 25 milliliters of ethanol provided 371 milligrams of material having a melting point of 124°–125.5° C. It was analyzed with the following results:

|  | Calc. ($C_{20}H_{28}O_5$) | Found |
|---|---|---|
| Percent C | 68.95 | 69.02 |
| Percent H | 8.10 | 8.12 |
| Percent $CH_3O$ | 17.81 | 17.81 |

The dimethyldihydro F.E.S. is substituted for dihydro F.E.S. in the procedure set forth in Example IV to produce a compound having the formula:

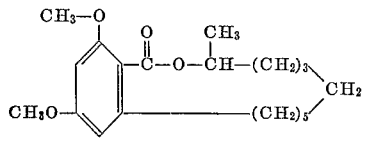

Example XI

Six head of cattle are fed a daily ration including a mixture of alfalfa hay and ground corn cobs containing from 1 to 20 ounces of the compound produced in Example V per hundred pounds of ration to increase the rate of growth of the cattle.

Example XII

Six head of cattle are fed a daily ration including a mixture of alfalfa hay and ground corn cobs containing from 1 to 20 ounces of the compound produced in Example X per hundred pounds of ration to increase the rate of growth of the cattle.

It is claimed:

1.

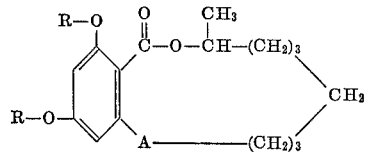

where A is selected from the group consisting of

—CH=CH— and —$CH_2CH_2$—, and R is selected from the group consisting of hydrogen, lower alkyl and lower saturated acyclic acyl.

2. The compound of claim 1 wherein A is

—CH=CH—

3. The compound of claim 2 wherein R is hydrogen.
4. An animal feed comprising a nutritional diluent and growth promoting amounts of the compound of claim 1.
5. The compound of claim 2 wherein R is methyl.
6. The compound of claim 2 wherein the R ortho to the ester group is methyl and the other R is hydrogen.
7. The compound of claim 2 wherein the R para to the ester group is methyl and the other R is hydrogen.
8. The compound of claim 2 wherein the R ortho to the ester group is methyl and the other R is acetyl.
9. The compound of claim 2 wherein the R para to the ester group is methyl and the other R is acetyl.
10. The compound of claim 1 wherein A is

—CH$_2$—CH$_2$—

11. The compound of claim 10 wherein R is hydrogen.
12. The compound of claim 10 wherein R is methyl.
13. An animal feed comprising a nutritional diluent and growth promoting amounts of the compound of claim 3.
14. An animal feed comprising a nutritional diluent and growth promoting amounts of the compound of claim 5.
15. An animal feed comprising a nutritional diluent and growth promoting amounts of the compound of claim 6.
16. An animal feed comprising a nutritional diluent and growth promoting amounts of the compound of claim 7.
17. An animal feed comprising a nutritional diluent and growth promoting amounts of the compound of claim 8.
18. An animal feed comprising a nutritional diluent and growth promoting amounts of the compound of claim 9.
19. An animal feed comprising a nutritional diluent and growth promoting amounts of the compound of claim 11.
20. An animal feed comprising a nutritional diluent and growth promoting amounts of the compound of claim 12.

References Cited by the Examiner

UNITED STATES PATENTS 2,842,051   7/1958   Brian et al. _____ 99—2

OTHER REFERENCES

Stob et al.: Nature, vol. 196, page 1318, Dec. 29, 1962.

A. LOUIS MONACELL, *Primary Examiner.*